United States Patent Office 3,121,083
Patented Feb. 11, 1964

3,121,083
6-(5-NITRO-2-FURYL)URACIL
John C. Howard, Augusta, Ga., assignor to The Norwich Pharmacal Company, a corporation of New York
No Drawing. Filed Feb. 7, 1962, Ser. No. 171,584
2 Claims. (Cl. 260—260)

This invention relates to the nitrofuran compound 6-(5-nitro-2-furyl)uracil represented by the formula:

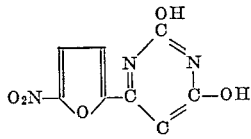

This compound is a high melting, crystalline solid, somewhat soluble in organic solvents and very insoluble in water. It possesses a broad antibacterial spectrum. Bacteria which are sensitive to very small amounts of this compound include *Escherichia coli*, *Salmonella typhosa*, *Streptococcus pyogenes*, *Streptococcus agalactiae*, and *Erysipelothrix insidiosa*. Thus, this compound is adapted to be employed as the toxic constituent of topical compositions aimed at eradicating and preventing bacterial infection. Furthermore, it is endowed with systemic activity; effectively combatting lethal *Salmonella typhosa* infection in mice when administered orally in doses far less than those provoking host response. For example, a single dose of about 250 mg./kg. administered orally serves to prevent mortality.

The compound of this invention can be readily prepared. The method now preferred consists in nitrating 6-(2-furyl)uracil which is readily prepared by heating a mixture of urea and an alkyl ester of furoylacetic acid.

In accordance with this preferred method an alkyl ester of furoylacetic acid, for instance the ethyl ester, is heated with urea until interaction denoted by ebullition takes place. The mixture is cooled, poured into water, slurried and filtered to recover 6-(2-furyl)uracil.

The intermediate thus obtained may be readily nitrated. A convenient and readily prepared nitrant is mixed acid. The intermediate is merely placed in sulfuric acid and nitric acid added with stirring in an appropriate amount. The mixture is quenched and the desired end product, 6-(5-nitro-2-furyl)uracil, recovered by filtration.

In order that this invention may be fully available to and understood by those skilled in the art, a method for preparing it is briefly described:

A. A mixture of 224 g. (1.23 moles) of ethyl furoylacetate and 90 g. (1.5 moles) of urea is heated in an evaporating dish at 155–160° until frothing begins. The dish is removed from the hot plate and the mixture stirred until a yellow near-solid forms. This is added, after cooling, to about 200 ml. of warm water, stirred and the precipitate collected. The precipitate is washed with methanol until a dark filtrate is no longer observed, then washed with ether and dried at 110°. The yield is 58 g. of 6-(2-furyl)uracil.

B. To 38 g. (0.21 mole) of 6-(2-furyl)uracil is added 400 ml. of concentrated sulfuric acid at 10°. The mixture is stirred well and cooled to —2°. To it is added 14 ml. (0.2 mole) of concentrated nitric acid in 25 ml. of concentrated sulfuric acid with stirring at —2° to 0°. After the addition is complete, the mixture is poured with stirring into 2 l. of ice water. The brick-red solid is collected, washed with methanol and ether and dried. The yield is 13 g. (29%) of 6-(5-nitro-2-furyl)uracil.

Analysis:

|  | C | H | N |
|---|---|---|---|
| Calc | 43.06 | 2.26 | 18.83 |
| Fd | 43.10 | 2.40 | 18.74 |

What is claimed is:
1. The compound 6 - (5 - nitro -2 - furyl)uracil represented by the formula:

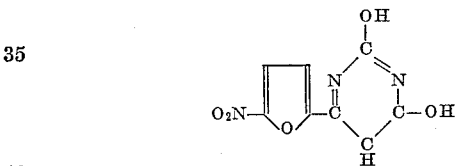

2. The process for preparing 6-(5-nitro-2-furyl)uracil which comprises heating a lower alkyl ester of furoylacetic acid with urea to form 6-(2-furyl)uracil, followed by nitration of said 6-(2-furyl)uracil intermediate.

No references cited.

UNITED STATES PATENT OFFICE
CERTIFICATE OF CORRECTION

Patent No. 3,121,083            February 11, 1964

John C. Howard

It is hereby certified that error appears in the above numbered patent requiring correction and that the said Letters Patent should read as corrected below.

Column 1, lines 10 to 15, and column 2, lines 33 to 40, th formula, each occurrence, should appear as shown below instead of as in the patent:

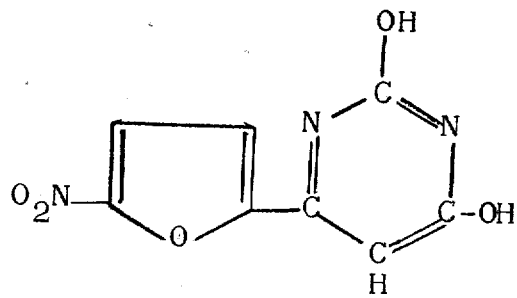

Signed and sealed this 1st day of December 1964.

(SEAL)
Attest:

ERNEST W. SWIDER
Attesting Officer

EDWARD J. BRENNER
                                       Commissioner of Patents